(No Model.) 3 Sheets—Sheet 1.
J. L. MILLS.
LAWN MOWER.
No. 436,738. Patented Sept. 16, 1890.
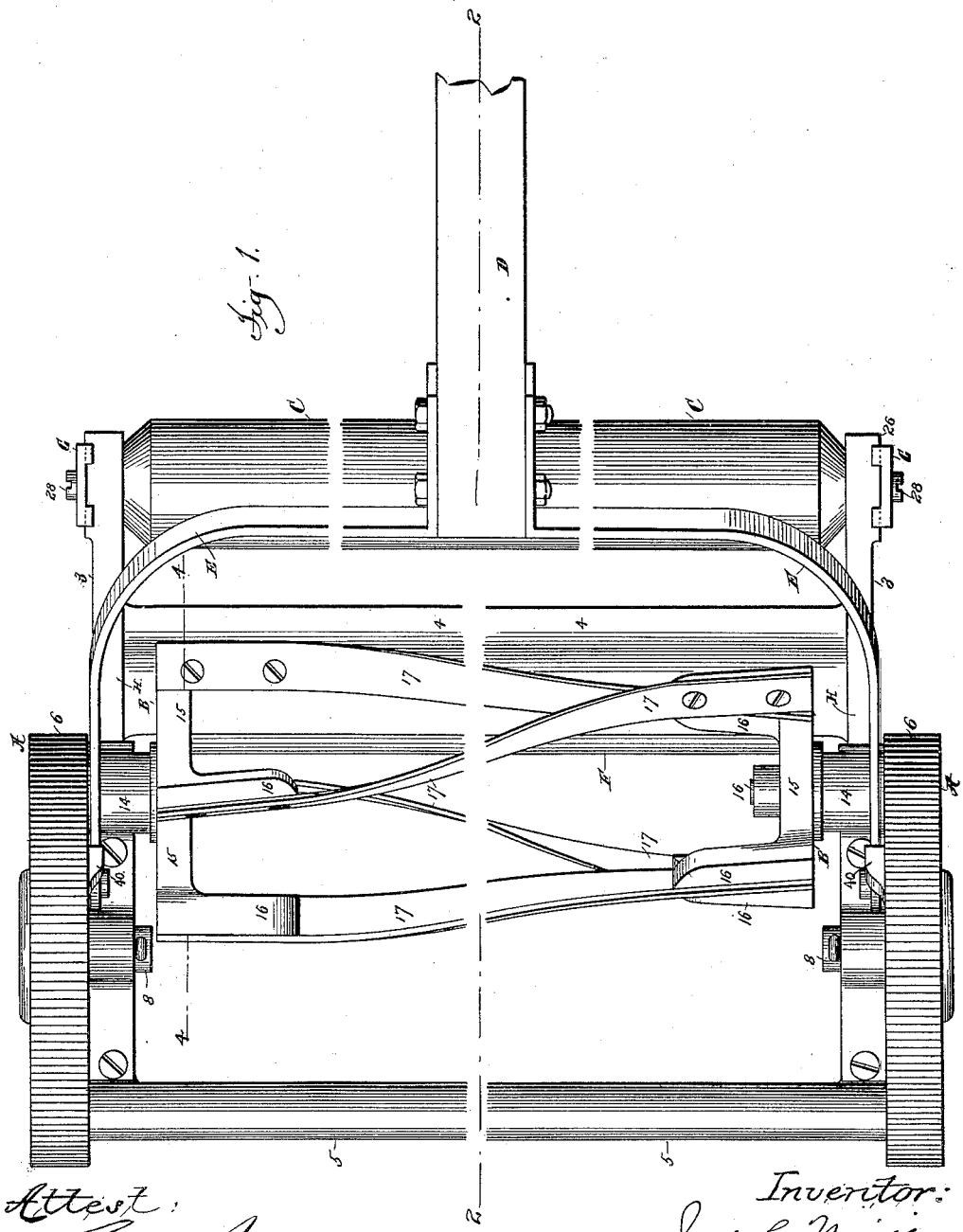
Attest:
Geo. H. Bott
J. J. Kennedy
Inventor:
Joel L. Mills
By Philipp Phelps & Hovey
Attys

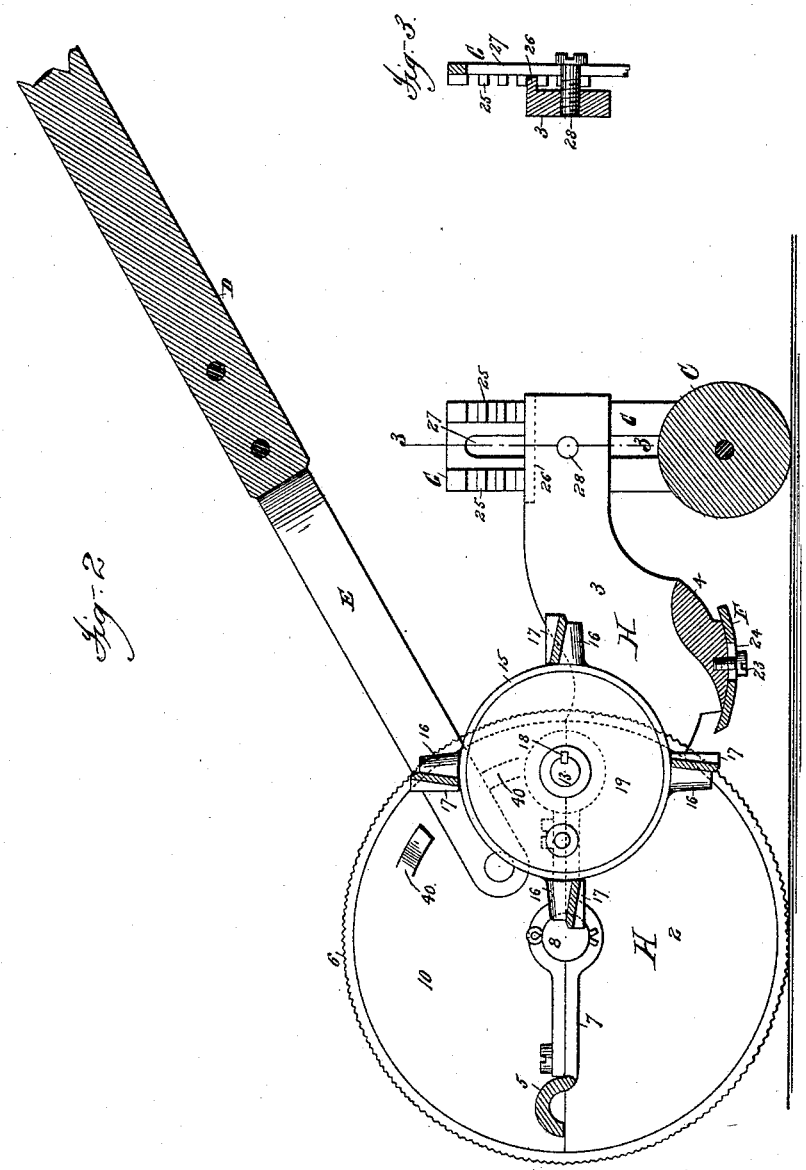

(No Model.) 3 Sheets—Sheet 3.

J. L. MILLS.
LAWN MOWER.

No. 436,738. Patented Sept. 16, 1890.

Attest:
Geo. H. Bott
J. J. Kennedy

Inventor:
Joel L. Mills
By Philipp, Philpp & Hovey
Attys.

UNITED STATES PATENT OFFICE.

JOEL L. MILLS, OF BROOKLYN, NEW YORK.

LAWN-MOWER.

SPECIFICATION forming part of Letters Patent No. 436,738, dated September 16, 1890.

Application filed November 19, 1888. Serial No. 291,273. (No model.)

*To all whom it may concern:*

Be it known that I, JOEL L. MILLS, a citizen of the United States, residing at Brooklyn, county of Kings, and State of New York, have invented certain new and useful Improvements in Lawn-Mowers, fully described and represented in the following specification, and the accompanying drawings, forming a part of the same.

This invention relates generally to improvements in the construction and mode of adjustment of different parts of lawn-mowers of that class in which are employed rotary heads carrying spiral cutter-blades acting in conjunction with a fixed cutter-blade, said rotary heads and blades deriving their rotary motion through suitable connections from the ground-wheels of the mower.

The present invention consists in various features of construction and combinations of parts, all of which will be hereinafter more particularly described, and pointed out in the claims.

The improvements constituting the present invention will be most readily understood from a detailed description and an illustration of an organization in which they are embodied. All preliminary description will therefore be dispensed with and a somewhat detailed description given of such an organization, reference being had in such description to the accompanying drawings, in which—

Figure 4:
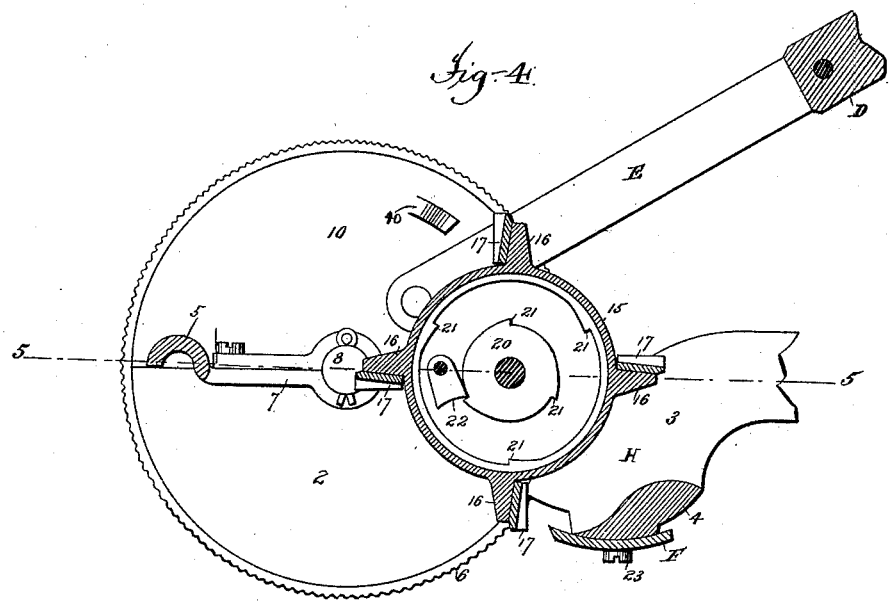
Figure 5:
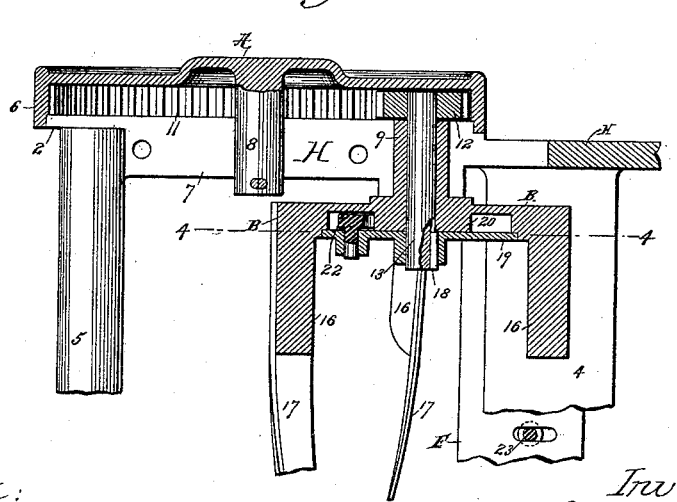

Figure 1 is a plan view of a lawn-mower constructed according to my invention. Fig. 2 is a longitudinal sectional elevation taken on the line 2 of Fig. 1. Fig. 3 is a vertical section on the line 3 of Fig. 2. Fig. 4 is a longitudinal section on the lines 4 of Figs. 1 and 5, and Fig. 5 is a horizontal section on the line 5 of Fig. 4.

Referring to said drawings, it will be seen that A A represent the ground-wheels of the mower; B B, the rotary cutter-heads; C, the ground-roller; D, the handle, and E E curved rods by which said handle is connected to the mower.

The frame of the machine is, as will be seen by reference to Figs. 1 and 2, made in a single casting, which includes the sides H of the frame and also front and rear tie-bars 5 4.

Before entering upon a detailed description of the different parts of the mower it will first be remarked that as the parts upon each side of the mower are exact duplicates as to construction and mode of operation of those upon the other side, a description of those upon one side only will suffice for a ready understanding of the invention.

Referring now particularly to Figs. 1 and 2, the construction of the frame therein illustrated will be described. As shown therein, each side H of the frame forms at its front a plate 2, which is of semicircular form and fits within the flange 6 of the ground-wheel A, so as to form a casing for the lower half of said wheel upon its inner side. The plate 2 is also provided with a flanged upper edge 7, in which are formed the lower halves of the boxes for the journals 8 9 of the ground-wheel A and the cutter-head B. The rear portion 3 of each side H is of the form shown, and is supported in position by the rack-bar in which the ground-roller C is journaled, as hereinafter described. The rearwardly-extending portions 3 of the sides H of the frame are connected by a transverse bar 4, which forms the rear tie-bar and carries the fixed cutter of the mower. The plates 2 of the sides are also connected by a front tie-bar 5, which is an extension of the flanges 7 and extends transversely across the machine, as shown in Fig. 1.

The construction and mode of operation of the ground-wheel A and the rotary cutter-head B and their operating connections will now be described. As before remarked, the ground-wheel A has formed upon its periphery an inwardly-extending flange 6, upon a shoulder in which is seated the plate 2, forming a casing for the lower half of said wheel. The upper half of said wheel also receives a similarly-shaped plate 10, seated within its flange and completing the casing of said wheel, which plate is secured to the sides of the frame, and forms the upper halves of the boxes for the journals 8 9. The rods E of the handle are pivoted to the plates 10, and the plates are provided with stops 40 to limit the movement of the handle. The flange 6 has cut upon its inner periphery gear-teeth 11, engaging with a pinion 12. The shaft 13 of the pinion 12 extends through and turns freely in a longitudinal opening in the journal 9 of the head B, as shown in Figs. 2 and 5. The rotary cutter-head B is provided upon its inner side with a circular flange 15, upon which are cast, in the manner shown, a series of spiral projections 16, to which are detachably secured, as best shown in Fig. 1, spiral cutter-blades 17. The shaft 13 of the pinion 12 has connected to its inner end, by means of a key 18, a circular plate 19, seated loosely on a shoulder formed upon the inner surface of the flange 15 of the cutter-head and resting against a circular projection 20, formed on the cutter-head and inclosed within said flange, as shown in Fig. 5. When the wheel A has been put in motion, movement will be imparted by it to the pinion 12 and through the shaft 13 to the plate 19. For the purpose of having this movement of the plate 19 communicated to the rotary cutter-head B and its blades 17, the internal periphery of the flange 15 and the periphery of the circular projection 20 of said rotary head are each provided with a series of ratchet-teeth 21 (see Fig. 4) which, when the ground-wheel A and pinion 12 are revolved in a forward direction, will be engaged by a pawl 22, pivoted to the plate 19, as shown in Fig. 5, said pawl, during the backward rotation of said ground-wheel and pinion, passing idly over the teeth 21, and during their forward rotation engaging with a tooth 21 upon the flange 15 or projection 20, (whichever tooth is nearest at the time of movement,) and causing the rotary cutter-head and its blades to rotate also in a forward direction. The teeth 12 of the two series are, as will be observed, arranged so as to alternate with each other, and the pawl 22 is of such form that as it is retracted over a tooth of either series it is moved inward or outward as the case may be, so as to be in position to engage with a tooth of the other series when its movement is reversed, thus moving the pawl positively and preventing it from being rendered inoperative by sticking upon its pivot.

The construction which has been described provides an exceedingly simple and economical form of rotary cutter, the two heads B being exact duplicates and being cast entirely independent of each other. The spiral blades 17, when fastened to the arms 16 so as to connect the heads, make an exceedingly rigid and light cutter. The blades 17 being removable it is possible to renew any one blade which may become worn without renewing the entire cutter.

By the present construction the pawl-and-ratchet mechanism being located in the heads of the cutter can readily be made of much greater size and strength, and can be located at a greater distance from the axis of the cutter, thereby subjecting it to less strain.

The construction and arrangement of the fixed blade and its method of adjustment upon the transverse bar 4 will now be described. The bar 4, as before remarked, extends transversely across the machine between the rear portions 3 3 of the frame. (See Fig. 1.) The cutter-blade F is of curved form, (see Figs. 2 and 4,) and is secured to the under side of the transverse bar 4 (which is convex in form to accommodate itself to the shape of the cutter-blade) by means of screw-threads 23, passing through transverse slots 24 in the cutter-blade F. When it is desired to adjust the cutter-blade F at any desired distance from the rotary spiral blades 17, the screw-studs 23 will be loosened and the cutter-blade moved forward or backward to the proper extent, and then secured again in its adjusted position by tightening said screw-studs. It will be noticed that the advance of the cutter-blade F upon the bar 4 causes it also to rise and its retraction upon said bar causes it to fall, this being due to the curvilinear form of said cutter-blade and transverse bar 4.

The rear portions 3 3 of the frame are supported in proper position above the ground upon vertical rack-bars G G—one upon each side of the mower—in the lower ends of which are journaled the ends of the ground-roller C. (See Figs. 2 and 3.) These bars are formed upon their inner surfaces with teeth 25, into which mesh teeth 26 upon the respective adjacent surfaces of the rear portions 3 3 of the frame. The vertical plates G are each also provided with a central slot 27, in which moves a screw-stud 28, secured to the rear portion 3. When it is desired to adjust the mower for the production of any particular height of cut or for any particular piece of field work, the screw-stud 28 will be loosened and the rear portion 3 of the frame raised or lowered, as the case may be, to the required position, and its tooth 26 brought into engagement with the teeth 25 of the bar G and be locked in its adjusted position by tightening the screw-stud 28.

It is obvious that modifications may be made in the construction and arrangement of many of the parts above described, and that combinations claimed may be employed in machines the general construction of which differs from that shown and described without departing from the present invention.

What I claim is—

1. In a lawn-mower, a frame consisting of a single casting comprising sides H, having plates 2 2 for partly inclosing the driving-gearing and provided with one member of the boxes for the journals of the ground-wheels and rotary cutter, said sides also having rearward extensions 3 3 for supporting the ground-roll, said casting also comprising the tie-bar 5, connecting the plates 2 2, and the tie-bar 4, connecting the extensions 3 and supporting the fixed cutter, substantially as described.

2. In a lawn-mower, the combination, with a frame consisting of a single casting comprising sides H, having plates 2 2 for partly inclosing the driving-gearing and provided with one member, of the boxes for the journals of the ground-wheels and rotary cutter, said sides also having rearward extensions 3 3 for supporting the ground-roll, said casting also comprising the tie-bar 5, connecting the plates 2 2, and the tie-bar 4, connecting the extensions 3 and supporting the fixed cutter with the plates 10, provided with the other member of the boxes for the journals of the ground-wheels and rotary cutter and completing the inclosure for the driving-gearing, substantially as described.

3. In a lawn-mower, the combination of a fixed cutter, a rotary cutter consisting of two independent heads B B, having arms 16, each of said heads being provided on its inner side with two concentric series of alternating ratchet-teeth and with spirally-arranged blades 17, secured to said arms, ground-wheels having internal gears, shafts 13, passing through openings in the journals of the heads and terminating at the inner sides of the heads, pinions 12, secured to the outer ends of said shafts and engaging the gears of the ground-wheels, plates 19, secured to the inner ends of said shafts, and pawls 22, pivoted to said plates and located between said series of ratchet-teeth, said pawls and ratchet-teeth being so constructed that each pawl on its reverse movement is oscillated by engagement with said ratchet-teeth into position to engage a tooth of one or the other series upon its forward movement to connect said cutter-head and ground-wheels, substantially as described.

4. In a lawn-mower, the combination, with a ground-wheel, of a shaft driven by said wheel, a rotary cutter-head loose upon said shaft, two concentric series of alternating ratchet teeth or projections upon said cutter-head, and a pivoted pawl located between said two series of teeth or projections and carried by said shaft, said pawl and ratchet-teeth being so constructed that the pawl on its reverse movement is oscillated by engagement with said ratchet-teeth to engage a tooth of one or the other series upon its forward movement to connect said cutter-head and ground-wheel, substantially as described.

5. The combination, with a shaft, of a rotary head loose upon said shaft, two concentric series of alternating ratchet-teeth or projections upon one of the members, and a pivoted pawl located between said series of teeth or projections and carried by the other member, said pawl and ratchet-teeth being so constructed that the pawl on the reverse movement of the driven member is oscillated by engagement with the ratchet-teeth into position to engage a tooth of one or the other series upon the forward movement of the driven member, substantially as described.

In testimony whereof I have hereunto set my hand in the presence of two subscribing witnesses.

JOEL L. MILLS.

Witnesses:
J. J. KENNEDY,
GEO. H. BOTTS.